(12) United States Patent
Brouwers et al.

(10) Patent No.: US 11,465,293 B2
(45) Date of Patent: Oct. 11, 2022

(54) AUTONOMOUS FLOOR CLEANER

(71) Applicant: BISSELL Inc., Grand Rapids, MI (US)

(72) Inventors: Andrew James Brouwers, Grand Rapids, MI (US); Jake Andrew Mohan, Grand Rapids, MI (US); Eric Daniel Buehler, Grand Rapids, MI (US)

(73) Assignee: BISSELL Inc., Grand Rapids, MI (US)

( * ) Notice: Subject to any disclaimer, the term of this patent is extended or adjusted under 35 U.S.C. 154(b) by 642 days.

(21) Appl. No.: 16/527,591

(22) Filed: Jul. 31, 2019

(65) Prior Publication Data

US 2020/0039079 A1 Feb. 6, 2020

Related U.S. Application Data

(60) Provisional application No. 62/712,650, filed on Jul. 31, 2018.

(51) Int. Cl.
| | | |
|---|---|---|
| *B25J 11/00* | (2006.01) | |
| *A47L 9/28* | (2006.01) | |
| *B25J 9/00* | (2006.01) | |
| *A47L 11/40* | (2006.01) | |
| *B25J 9/16* | (2006.01) | |

(52) U.S. Cl.
CPC ......... *B25J 11/0085* (2013.01); *A47L 9/2826* (2013.01); *A47L 9/2842* (2013.01); *A47L 11/4011* (2013.01); *B25J 9/0003* (2013.01); *B25J 9/1666* (2013.01); *A47L 2201/04* (2013.01); *G05D 2201/0215* (2013.01)

(58) Field of Classification Search
CPC .... B25J 11/0085; B25J 9/0003; B25J 9/1666; A47L 9/2826; A47L 9/2842; A47L 2201/04; G05D 2201/0215
See application file for complete search history.

(56) References Cited

U.S. PATENT DOCUMENTS

| | | |
|---|---|---|
| 6,481,515 B1 | 11/2002 | Kirkpatrick et al. |
| 7,225,500 B2 | 7/2007 | Diehl et al. |
| 7,801,645 B2 | 9/2010 | Taylor et al. |
| 8,794,367 B2 | 8/2014 | Chung et al. |
| 9,918,605 B2 | 3/2018 | Wolfe et al. |
| 2018/0149753 A1 | 5/2018 | Shin et al. |
| 2018/0168414 A1 | 6/2018 | Jee et al. |
| 2018/0263447 A1 | 9/2018 | Yim et al. |

FOREIGN PATENT DOCUMENTS

WO 9303399 A1 2/1993

*Primary Examiner* — Andrew A Horton
(74) *Attorney, Agent, or Firm* — Quinn IP Law (57) ABSTRACT

An autonomous floor cleaner, such as a robotic vacuum cleaner, includes an autonomously moveable housing carrying a vacuum collection system for generating a working air flow for removing dirt from the surface to be cleaned and storing the dirt in a collection space. A bumper is provided on the housing and provides obstacle sensing redundancy. The bumper can be provided with a cliff sensor actuator member that activates an associated cliff sensor upon an impact or obstacle event.

20 Claims, 10 Drawing Sheets

AUTONOMOUS FLOOR CLEANER

CROSS-REFERENCE TO RELATED APPLICATION(S)

This claims the benefit of U.S. Provisional Patent Application No. 62/712,650, filed Jul. 31, 2018, which is incorporated herein by reference in its entirety.

BACKGROUND

Autonomous or robotic floor cleaners can move without the assistance of a user or operator in order to clean a floor surface. For example, the floor cleaner can be configured to sweep dirt (including dust, hair, and other debris) into a collection bin carried on the floor cleaner and/or to sweep dirt using a cloth which collects the dirt. The floor cleaner can move randomly about a surface while cleaning the floor surface or use a mapping/navigation system for guided navigation about the surface. Some autonomous floor cleaners have a bumper with sensors for detecting impacts to the bumper.

BRIEF DESCRIPTION

An aspect of the present disclosure relates to an autonomous surface cleaner, including an autonomously moveable housing defining an outer periphery, a collection system carried by the autonomously moveable housing and including a working air path through the housing having an air inlet and an air outlet, a suction nozzle defining the air inlet, and a suction source in fluid communication with the suction nozzle, a set of cliff sensors carried by the autonomously moveable housing, at least one bumper provided on at least a portion of the outer periphery and moveably coupled thereto between a home position and a compressed position that is moved inwardly towards the autonomously moveable housing from the home position, and at least one controller configured to receive information from the set of cliff sensors and determine one of a cliff event indicative of a drop or an impact event indicative of an obstacle An aspect of the present disclosure relates to a method for operating an autonomous floor cleaner, the method including driving an autonomously moveable housing having a moveable bumper provided adjacent at least one cliff sensor and determining, via a controller, from an output of the at least one sensor cliff sensor and at least one of: a position of the bumper, input from a dedicated obstacle sensor, an inertial measurement unit, or drive system data whether a cliff event has occurred or an impact event has occurred

DETAILED DESCRIPTION

Aspects of the present disclosure relate to autonomous or robotic floor cleaners, including but not limited to autonomous or robot vacuum cleaners. In one of its aspects, the disclosure relates to improved obstacle sensing for an autonomous vacuum cleaner. In another aspect, the disclosure relates to an improved bumper for an autonomous vacuum cleaner.

Figure 1:
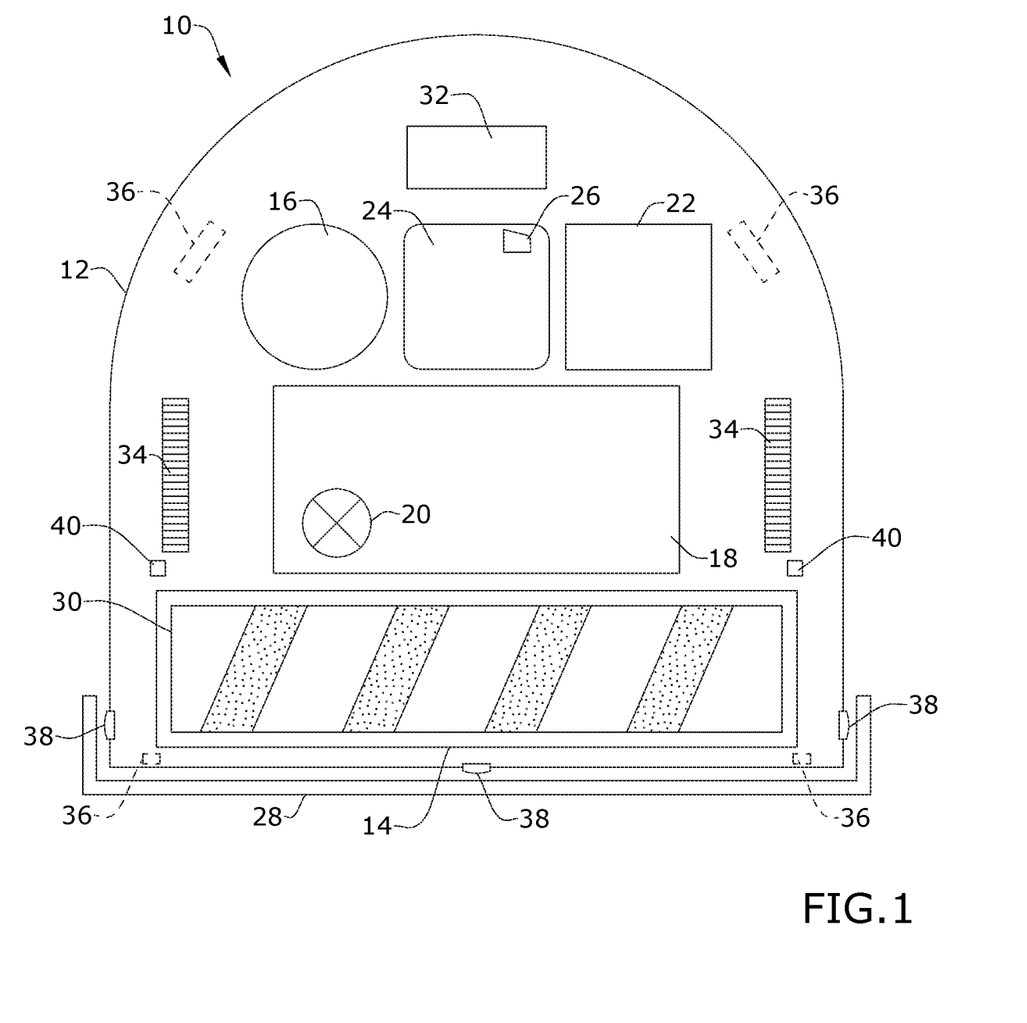
FIG. 1 is a schematic view of an autonomous vacuum cleaner according to an aspect of the present disclosure.

FIG. 1 is a schematic view of an autonomous floor cleaner according to a first aspect of the disclosure. The autonomous floor cleaner has been illustrated as a robotic vacuum cleaner 10 that mounts the components various functional systems of the vacuum cleaner in an autonomously moveable housing or unit 12, including components of a vacuum collection system for generating a working air flow for removing dirt (including dust, hair, and other debris) from the surface to be cleaned and storing the dirt in a collection space on the vacuum cleaner, and a drive system for autonomously moving the vacuum cleaner over the surface to be cleaned. While not illustrated, the autonomous vacuum cleaner 10 can be provided with additional functional systems, such as a navigation system for guiding the movement of the vacuum cleaner over the surface to be cleaned, a mapping system for generating and storing maps of the surface to be cleaned and recording status or other environmental variable information, and/or a dispensing system for applying a treating agent stored on the vacuum cleaner to the surface to be cleaned.

The vacuum collection system can include a working air path through the unit having an air inlet and an air outlet, a suction nozzle 14, a suction source 16 in fluid communication with the suction nozzle 14 for generating a working air stream through the working air path, and a dirt bin 18 for collecting dirt from the working airstream for later disposal. The suction nozzle 14 can define the air inlet of the working air path. The suction source 16 can be a motor/fan assembly carried by the unit 12, fluidly upstream of the air outlet, and can define a portion of the working air path. The dirt bin 18 can also define a portion of the working air path and comprise a dirt bin inlet in fluid communication with the air inlet. A separator 20 can be formed in a portion of the dirt bin 18 for separating fluid and entrained dirt from the working airstream. Some non-limiting examples of the separator include a cyclone separator, a filter screen, a foam filter, a HEPA filter, a filter bag, or combinations thereof.

The suction source 16 can be electrically coupled to a power source 22, such as a rechargeable battery. In one example, the battery can be a lithium ion battery. Charging contacts for the rechargeable battery can be provided on the exterior of the main housing. A docking station (not shown) for receiving the unit for charging can be provided with corresponding charging contacts. A user interface 24 can be provided with any components both interior and exterior of the main housing that allow operation and control of the autonomous vacuum cleaner 10 by a user while the autonomous vacuum cleaner 10 simultaneously feeds back information that aids the user's decision-making process. In one non-limiting example, the user interface 24 includes at least a suction power switch 26 between the suction source 16 and the power source 22 that can be selectively closed by the user, thereby activating the suction source 16.

At least one bumper 28 can be provided at an outside edge of the unit 12, such as at the front and/or sides and/or rear of the unit 12. As used herein, "front" or "forward" and variations thereof are defined relative to the direction of forward travel of the autonomous vacuum cleaner 10, unless otherwise specified. The bumper 28 can be a guard configured to protect at least a portion of the unit 12, and can absorb shock and prevent damage to the autonomous vacuum cleaner 10 from collisions with obstacles.

In one embodiment, the bumper 28 can be disposed along the entire front of the unit 12 and partially along two opposing sides of the unit 12, and can be configured to move in response to front impacts, i.e. when the autonomous vacuum cleaner 10 strikes or collides with an object somewhere along the front of the autonomous vacuum cleaner 10, and in response to side impacts, i.e. when the autonomous vacuum cleaner 10 strikes or collides with an object somewhere along one of the sides of the autonomous vacuum cleaner 10.

The autonomous vacuum cleaner 10 can include an agitator such as a brushroll 30 adjacent the suction nozzle 14. In one example, the suction nozzle 14 and brushroll 30 are provided at a front of the autonomous unit 12. The brushroll 30 can be mounted for rotation about a substantially horizontal axis, relative to the surface over which the unit 12 moves.

A controller 32 is operably coupled with the various function systems of the autonomous vacuum cleaner 10 for controlling its operation. The controller 32 is operably coupled with the user interface 24 for receiving inputs from a user. The controller 32 can further be operably coupled with various sensors for receiving input about the environment and can use the sensor input to control the operation of the autonomous vacuum cleaner 10. The sensors are described in more detail below. The controller 32 can be a microcontroller unit (MCU) that contains at least one central processing unit (CPU).

The controller 32 can, for example, be operably coupled with the drive system for directing the autonomous movement of the vacuum cleaner over the surface to be cleaned. The drive system can include drive wheels 34 for driving the unit across a surface to be cleaned. As shown in FIG. 1, the drive wheels 34 can be located rearwardly of the brushroll 30. In addition to the drive wheels 34, the autonomous vacuum cleaner 10 can include additional non-driven wheels. The drive system can receive inputs from the controller 32 for driving the unit 12 across a floor. In particular, the left and right drive wheels 34 can be operably coupled with the controller 32 for propelling the unit 12 across a floor, based on inputs from the various sensors discussed above. The drive wheels 34 can be driven in a forward or reverse direction in order to move the unit 12 forwardly or rearwardly. Furthermore, the drive wheels 34 can be driven simultaneously or individually in order to turn the unit 12 in a desired direction.

The autonomous vacuum cleaner 10 can be configured to move randomly about a surface while cleaning the floor surface, using input from the various sensors discussed above to change direction or adjust its course as needed to avoid obstacles, or can be configured to use a navigation and mapping system for guided navigation about the surface to be cleaned. In one example, the autonomous vacuum cleaner 10 includes a navigation and path planning system that is operably coupled with the drive system. The system builds and stores a map of the environment in which the autonomous vacuum cleaner 10 is used, and plans paths to methodically clean the available area. An artificial barrier system (not shown) can optionally be provided with the autonomous vacuum cleaner 10 for containing the autonomous vacuum cleaner 10 within a user-determined boundary.

Among the various sensors for the autonomous vacuum cleaner 10 are one or more cliff sensors 36 and one or more obstacle sensors 38. Additional sensors may include at least one wall following sensor 40, distance sensors, and at least one inertial sensor.

The at least one wall following sensor 40 can be located near one side of the unit 12, behind the suction nozzle 14, and can include a side-facing optical, mechanical, or ultrasonic position sensor that provides distance feedback and controls the autonomous vacuum cleaner 10 so that the unit 12 can follow near a wall without contacting the wall. Two wall following sensors 40 are shown in the illustrated example, one on the right side of the unit 12 and one on the left side of the unit 12.

The distance sensors (not shown) can be located on the unit 12 for position sensing, and can be any sensor useful for providing measurements of distance or indications of proximity, including, but not limited to, infrared sensors, time-of-flight sensors, ultrasonic sensors, light detection and ranging (i.e. lidar) sensors, etc. Input from the distance sensors is used by the controller 32 to slow down and/or adjust the course of the unit 12 when objects are detected by the distance sensors. An example of an autonomous vacuum cleaner having a distance sensor and operation thereof is disclosed in U.S. Publication No. US2018/0078106, which is incorporated herein by reference in its entirety.

The at least one inertial sensor (not shown) can be an integrated sensor located on the controller 32, which may include a printed circuit board (PCB) assembly. The at least one inertial sensor can be configured as an inertial measurement unit (IMU) and can be a nine-axis gyroscope or accelerometer to sense linear, rotational and magnetic field acceleration. The integrated inertial sensor can use acceleration input data to calculate and communicate change in velocity and pose to the controller 32 for navigating the autonomous vacuum cleaner 10 around the surface to be cleaned.

A set of cliff sensors 36 can be included. It will be understood that "a set" can include any number of sensor(s), including only one sensor. The set of cliff sensors 36 can include multiple bottom-facing optical position sensors that provide distance feedback and control the autonomous vacuum cleaner 10 so that the unit 12 can avoid excessive drops such as stairwells or ledges. In the illustrated example, two cliff sensors 36 are provided in the front corners of the unit 12, behind the bumper 28 and in front of the suction nozzle 14 and the brushroll 30, and two other cliff sensors 36 are provided in the back corners of the unit 12, behind the drive wheels 34. In addition to optical sensors, the set of cliff sensors 36 can be mechanical or ultrasonic sensors and, can be mounted in alternate positions, such as alongside the brushroll, for example.

The bumper 28 interacts with the obstacle sensors 38 for determining front and/or side impacts to the autonomous vacuum cleaner 10. One or more obstacle sensors 38 can be provided at the front and/or sides of the unit 12, and can, for example, include tactile bump switch modules located behind the bumper 28. The bumper 28 is configured to move to actuate the appropriate obstacle sensor 38 depending on the impact type.

When one or more of the obstacle sensors 38 register an impact event, the autonomous vacuum cleaner 10 can react to avoid the obstacle. For example, the autonomous vacuum cleaner 10 can cease moving toward the obstacle, such as by driving one or both of the wheels 34 in reverse to avoid further impact with the obstacle, depending on the number and location of the obstacle sensors 38 that are activated. When one or more of the cliff sensors 36 register a cliff event, the autonomous vacuum cleaner 10 can react to restrict movement toward the cliff. For example, the autonomous vacuum cleaner 10 can cease moving toward the cliff, such as by driving only one of the wheels 34 to turn the unit 12 away from the cliff or by driving both wheels 34 in reverse to translate the unit 12 back from the cliff, depending on the number and location of the cliff sensors 36 that are activated.

Figure 2:
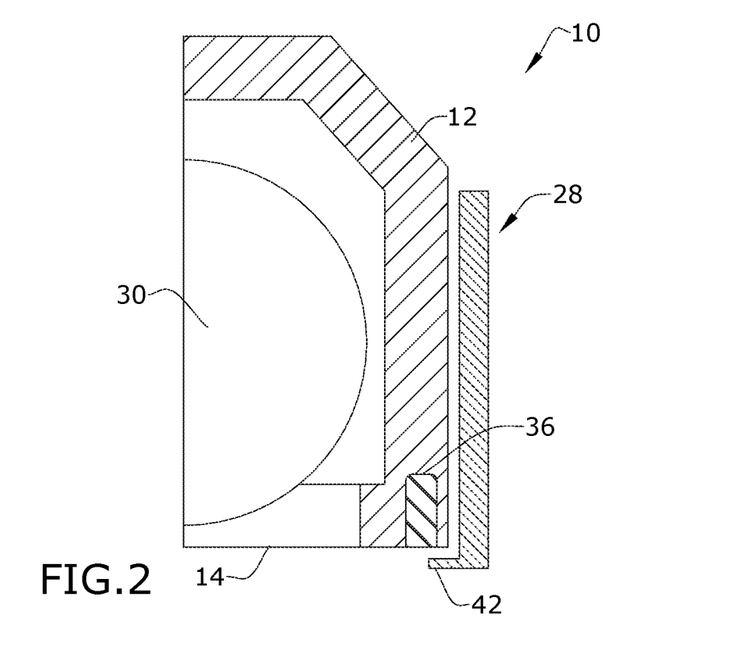
FIG. 2 is a schematic sectional view of a portion of the autonomous vacuum cleaner of FIG. 1, showing a bumper uncompressed.
Figure 3:
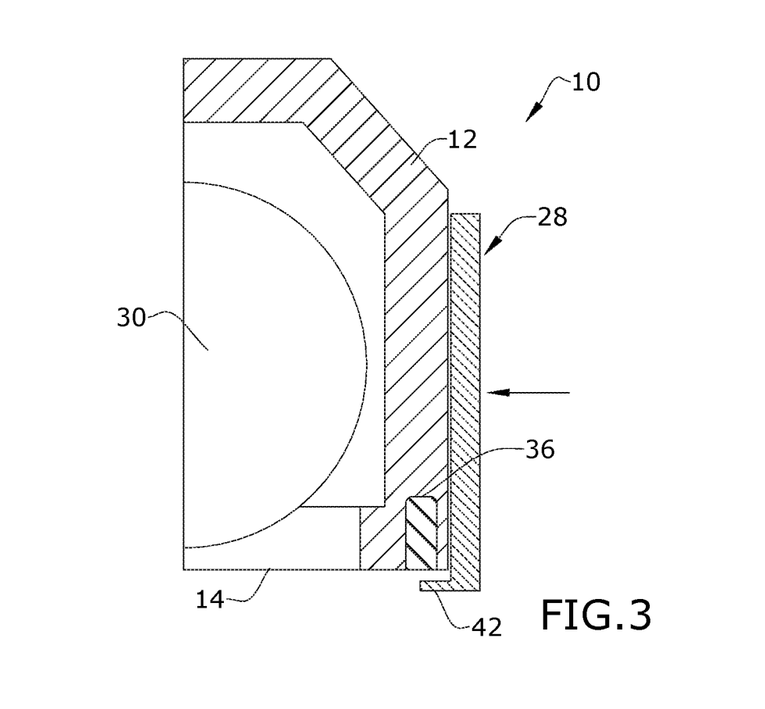
FIG. 3 is a view similar to FIG. 2, showing the bumper compressed after an impact to occlude a cliff sensor.

With reference to FIGS. 2-3, additionally, the bumper 28 interacts with at least one of the set of cliff sensors 36 for redundant obstacle sensing. As shown herein, the bumper 28 can be provided with a cliff sensor actuator member 42 that activates the associated cliff sensor 36. In one example, the cliff sensor actuator member 42 is an inwardly-extending projection on an inwardly-facing side of the bumper 28 that at least partially occludes the cliff sensor 36 when the bumper 28 is compressed. Other structures for partially occluding or occluding at least one of the set of cliff sensors 36 can also be provided on the bumper 28.

The cliff sensor actuator member 42 can be positioned closely to the cliff sensor 36 to maximize occlusion to the sensor's emitter and/or receiver. The cliff sensor actuator member 42 may be configured to only begin to occlude the cliff sensor 36 as the bumper 28 reaches full compression, one example of which is shown in FIG. 3.

The bumper 28 and associated cliff sensor 36 provide redundant obstacle sensing in case of failure of a primary obstacle sensor 38 (FIG. 1) without incurring the cost of adding additional sensing components. If one or more of the primary obstacle sensors 38 are prevented from operating, such as if there is debris or a foreign object preventing its operation, the bumper 28 and associated cliff sensor 36 provides a secondary solution to obstacle sensing.

When one or more of the cliffs sensors 36 are occluded by the bumper 28 due to an impact, and the obstacle sensors 38 fail to register the impact, the vacuum cleaner can treat this as a cliff event, and can react to restrict movement toward the obstacle. For example, the autonomous vacuum cleaner 10 can cease moving toward the obstacle, such as by driving only one of the wheels 34 to turn the unit 12 away from the obstacle or by driving both wheels 34 in reverse to translate the unit 12 back from the obstacle, depending on the number and location of the cliff sensors 36 that are activated. When one or more of the cliffs sensors 36 are occluded by the bumper 28 due to an impact, and one or more of the obstacle sensors 38 do register the impact, the autonomous vacuum cleaner 10 can treat this as an impact event, as described above.

Alternatively, the autonomous vacuum cleaner 10 can be configured to discern whether the cliff sensor 36 is triggered by an actual cliff event versus by the bumper 28. For example, when one or more of the cliff sensors 36 are occluded by the bumper 28 due to an impact, the autonomous vacuum cleaner 10 can treat this as an impact event rather than a cliff event. The controller 32 on the autonomous vacuum cleaner 10, and more specifically a CPU of the controller 32, can be configured to use an IMU to determine if a sensed cliff event is triggered as a result of contacting an obstacle. That is, when the cliff sensor 36 associated with the bumper 28 indicates a cliff event, data from the IMU can be used to determine if the autonomous vacuum cleaner 10 has in fact contacted an obstacle, or rather has been activated by the bumper 28. Optionally, data from wheel encoders of the drive system, which measure the distance travelled, can be used with IMU data to make this determination.

Figure 4:
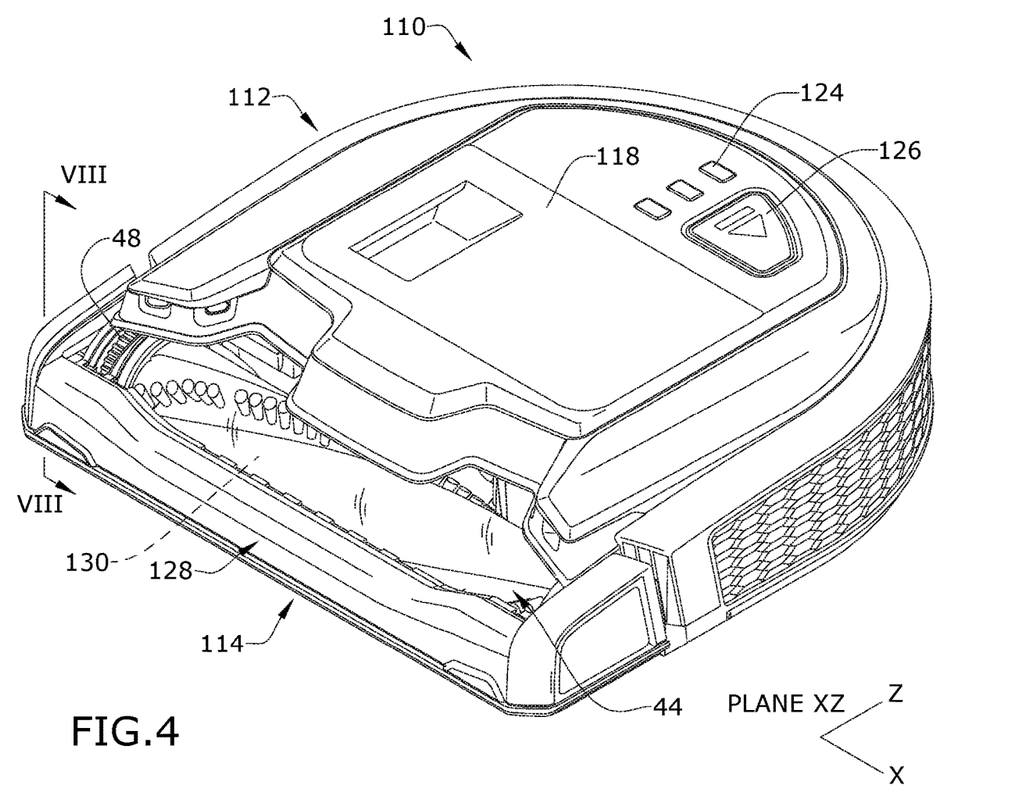
FIG. 4 is a perspective view of an example of the autonomous vacuum cleaner of FIG. 1.
Figure 5:
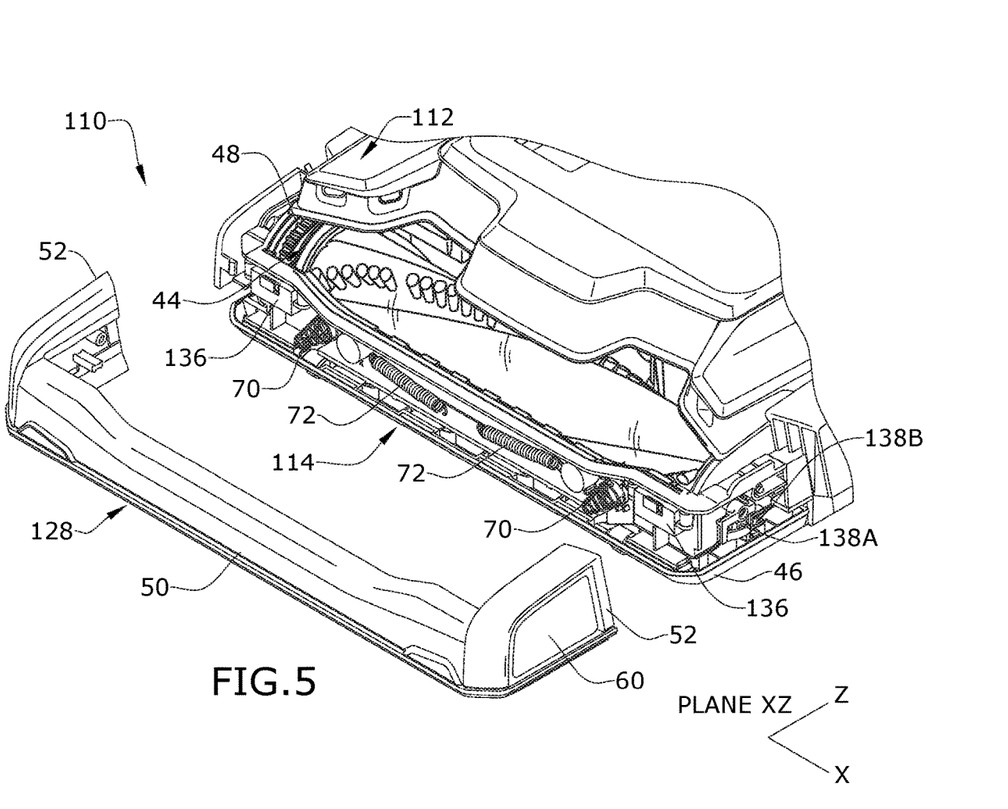
FIG. 5 is a partially exploded view of the autonomous vacuum cleaner of FIG. 4.

FIGS. 4-9 show one example of the autonomous vacuum cleaner 110 having a bumper 128 as described above with respect to FIGS. 1-3, in which like elements are described using the same reference numerals increased by 100. With reference to FIGS. 4-5, the autonomous vacuum cleaner 110 can include a brush chamber 44 at a front of the autonomous unit 112 in which the brushroll 130 is mounted. As used herein, "front" or "forward" and variations thereof are defined relative to the direction of forward travel of the autonomous vacuum cleaner 110, unless otherwise specified. The brushroll 130 is mounted for rotation about a substantially horizontal axis, relative to the surface over which the unit 112 moves. A sole plate 46 can at least partially retain the brushroll 130 in the brush chamber 44, and has an inlet opening defining the suction nozzle 114. A brushroll drive assembly (not shown) including a separate, dedicated brushroll drive motor can be provided within the unit 112 to drive the brushroll 130. Alternatively, the brushroll 130 can be driven by a motor of the suction source 16 (FIG. 1).

The autonomous vacuum cleaner 110 further includes a transparent brushroll window 48 at a front of the unit 112. The brushroll window 48 defines a portion of the brush chamber 44 in which the brushroll 130 is mounted. As such, the brushroll 130 is visible through the transparent portion of the window 48. The brushroll window 48 can be made from a clear or colored transparent material, such as polymethlamethacrylate.

The bumper 128 can be provided at the front of the unit 112, and may extend across a front portion of the brush chamber 44 and/or brushroll window 48. The bumper 128 can include a three-sided bumper, with a front wall or side 50 disposed along the entire front side of the unit 112, and two lateral walls or sides 52 extending partially along two opposing lateral sides of the unit 112. It is noted that, in the example illustrated herein, the bumper 128 is separate from the brushroll window 48. In an alternative example, the brushroll window 48 can be combined or integrated with the bumper 128.

The bumper 128 interacts with obstacle sensors 138A, 138B for determining side impacts and front impacts to the bumper 128, as well as with at least one cliff sensor 136 for redundant obstacle sensing, as described in further detail below. The bumper 128 can be adapted for a multi-directional movement for sensing obstacles in front of and on the sides of the autonomous vacuum cleaner 110. More specifically, the bumper 128, as shown herein, can be configured to slide multi-directionally along a plane XZ in response to front and side impacts, i.e. when the autonomous vacuum cleaner 110 strikes or collides with an object somewhere along the front or side of the autonomous vacuum cleaner 110. The plane XZ is defined by a generally horizontal plane or the surface over which the autonomous vacuum cleaner 110 moves.

The cliff sensors 136 can include multiple bottom-facing optical position sensors that provide distance feedback and control the autonomous vacuum cleaner 110 so that the unit 112 can avoid excessive drops such as stairwells or ledges. Two of the cliff sensors 136 can be provided at the front corners of the unit 112, and more specifically can be provided on the front of the brush chamber 44. Two cliff sensors (not shown) can be provided at the back corners of the unit 112. In addition to optical sensors, the cliff sensors 136 can be mechanical or ultrasonic sensors and, in all cases, the cliff sensors 136 can be mounted in alternative positions, such as at the center front of the unit 112 or at the sides of the unit 112, for example.

Side obstacle sensors 138A, only one of which is visible in FIG. 5, in the form of tactile bump switch modules are mounted to opposite sidewalls of the brush chamber 44, inwardly of the bumper 128. Each bump switch module comprises a PCB with a side-actuated bump switch, such as a tactile bump switch. Front obstacle sensors 138B, only one of which is visible in FIG. 5, in the form of optical switch modules are mounted to opposite sidewalls of the brush chamber 44, rearward of the side obstacle sensors 138A. Each optical switch module comprises a PCB with an optically-actuated switch, which can also be referred to as a slotted optical switch or photointerrupter, and further comprising an emitter and detector (not shown) spaced apart by an air gap and configured to sense the presence or absence of a light beam. Output signals from the obstacle sensors 138A, 138B provide inputs to the controller 32 (FIG. 1) for selecting an obstacle avoidance algorithm.

Figure 6:
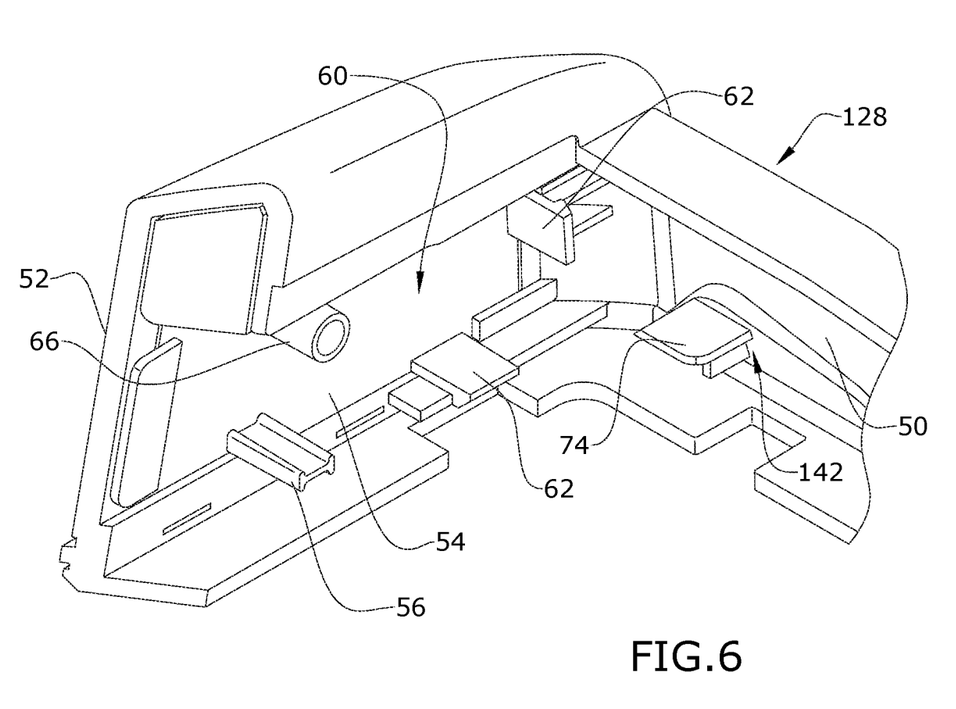
FIG. 6 is a rear close-up view of a portion of the bumper of the autonomous vacuum cleaner of FIG. 4.
Figure 7:
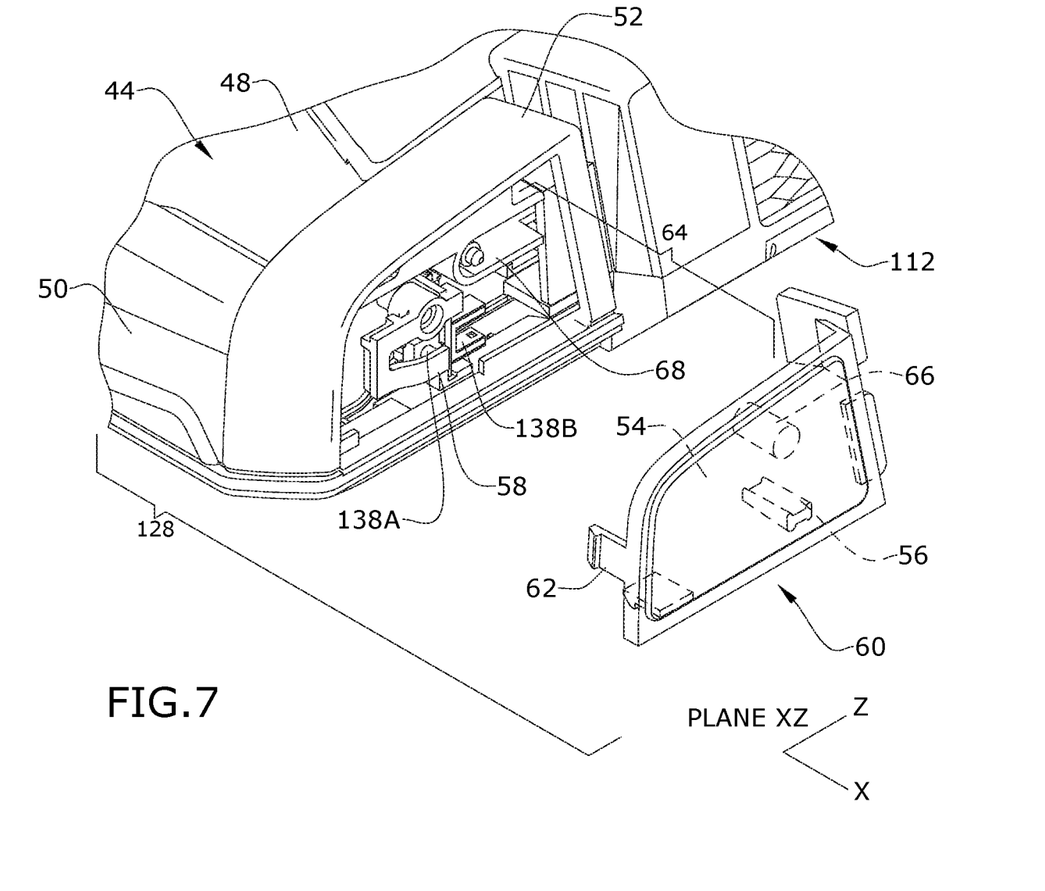
FIG. 7 is a partially exploded, close-up view of a portion of the autonomous vacuum cleaner of FIG. 4.

Referring to FIGS. 6-7, the bumper 128 can include sensor actuators 54, 56 for actuating the appropriate obstacle sensor 138A, 138B, respectively, depending on the impact type. For example, the sensor actuators 54, 56 can be configured to selectively dwell within the air gap of the obstacle sensors 138A, 138B depending on the position of the bumper 128, and more specifically, depending on impacts on the bumper 128.

In the example shown herein, the side obstacle sensor actuator 54, only one of which is visible in FIGS. 6-7, is an inner surface of the lateral sides 52 of the bumper 128 which displaces an intermediate actuator arm 58 carried on a housing of the unit 112, such as on the side of the of the brush chamber 44. The sensor actuator 54 moves to displace the intermediate actuator arm 58 inwardly whenever the bumper 128 encounters a side impact, thereby causing the associated side obstacle sensor 138A to register an obstacle event or impact event. Alternatively, the sensor actuator 54 carried on the bumper 128 can be configured to directly interact with the associated side obstacle sensor 138A, rather than using the intermediate actuator arm 58.

The front obstacle sensor actuator 56, only one of which is visible in FIGS. 6-7, is a rib projecting from an inner surface of the lateral sides 52 of the bumper 128. The sensor actuator 56 will be displaced or moved linearly whenever the bumper 128 encounters a front impact, thereby causing the associated front obstacle sensor 138B to register an obstacle event.

Optionally, the bumper 128 can include modular end caps 60, which can be snapped into opposite lateral sides 52 of the bumper 128 and retained by a plurality of mounting hooks 62 formed on the inner wall of each end cap 60. The end caps 60 can carry or form the sensor actuators 54, 56. The end caps 60 are modular, removable and replaceable and can thus provide a more facile bumper assembly process while also enhancing serviceability of the autonomous vacuum cleaner 110 by providing access to the obstacle sensors 138A, 138B on the sidewalls of the brush chamber 44. Other locations for the obstacle sensors 138A, 138B and sensor actuators 54, 56 are also possible.

The bumper 128 further includes a sliding joint 64 connecting the bumper 128 to the unit 112 for planar multi-directional movement along plane XZ. The sliding joint 64 can comprise a plurality of bearing surfaces between the bumper 128 and a housing of the unit 112, such as at the sides and along the front of the unit 112, to provide a stable connection therebetween.

The sliding joint 64 shown includes a post 66 formed on an inner surface of the bumper sides 52, such as on the bumper end caps 60, and which is received in a U-shaped track 68 provided on both sides of the brush chamber 44. Clearance is provided between the post 66 and the track 68 to allow the post 66 to slide planarly (i.e. front, back and side-to-side) about plane XZ within the track 68. Additional bearing surfaces (not shown) can be provided between the bumper 128 and brush chamber 44, such as on the front of the brush chamber 44.

Referring to FIG. 5, one or more forward return springs 70 can be provided between the front wall of the brush chamber 44 and the rear of the bumper 128 to bias the bumper 128 forwardly. In addition, one or more lateral return springs 72 can be provided between the front wall of the brush chamber 44 and the rear of the bumper 128 to bias the bumper 128 toward a center or neutral position, so that after a front or side impact force is removed, the bumper 128 will return to its original position in which the obstacle sensors 138A, 138B do not register an obstacle event.

Figure 8:
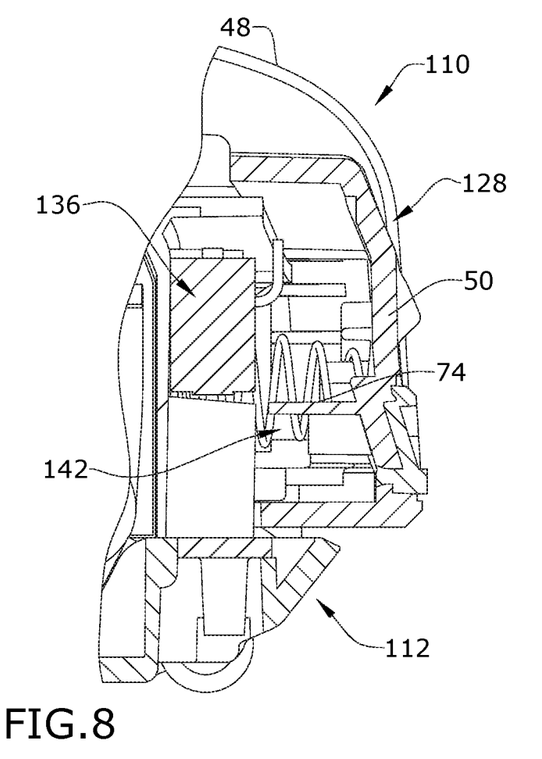
FIG. 8 is a section view through line VIII-VIII of the autonomous vacuum cleaner of FIG. 4.
Figure 9:
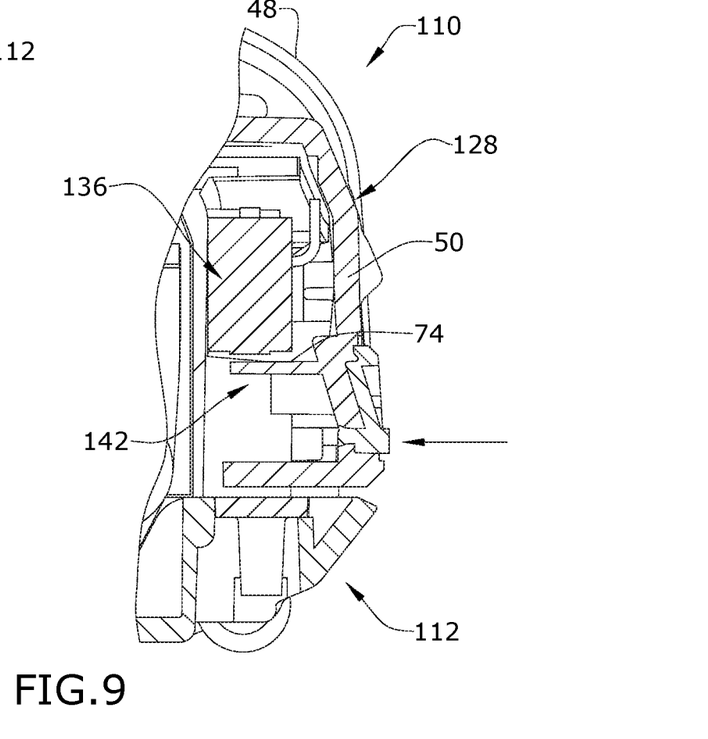
FIG. 9 is a view similar to FIG. 8, showing the bumper compressed after an impact to occlude a cliff sensor.

Referring to FIGS. 6 and 8-9, the bumper 128 of the example shown herein interacts with the two cliff sensors 136 provided at the front corners of the unit 112, and more specifically can be provided on the front of the brush chamber 44, for redundant obstacle sensing. The bumper 128 can be provided with cliff sensor actuator members 142 that activate the associated cliff sensors 136. In one example, the cliff sensor actuator members 142 are inwardly-extending projections 74 on an inwardly-facing surface of the front side 50 of the bumper 128 that occludes the associated cliff sensor 136 when the bumper 128 is compressed. Other structure for occluding the cliff sensors 136 can also be provided on the bumper 128, including, but not limited to, mirrors, lenses and bosses.

The cliff sensor actuator members 142 can be positioned closely to the cliff sensors 136 to maximize occlusion to the sensor's emitter and/or receiver. The cliff sensor actuator member 142 may be configured to only begin to occlude the cliff sensor 136 as the bumper 128 reaches full compression, one example of which is shown in FIG. 9.

The bumper 128 and associated cliff sensor 136 provide redundant obstacle sensing in case of failure of one or more of the primary obstacle sensors 138A, 138B without incurring the cost of adding additional sensing components. If one or more of the primary obstacle sensors 138A, 138B are prevented from operating, such as if there is debris or a foreign object preventing its operation, the bumper 128 and associated cliff sensor 136 provide a secondary solution to obstacle sensing. This may be particularly useful in the case of optical obstacle sensors configured to nominally block a light beam when the bumper is uncompressed, which can be subject to malfunction if the light beam becomes occluded regardless of bumper state. In the example shown herein, the bumper 128 and associated cliff sensor 136 particularly provide redundant obstacle sensing in case of failure of one or more of the front obstacle sensors 138B, which can be optical sensors. In other examples, the bumper 128 and associated cliff sensor 136 can provide redundant obstacle sensing in case of failure of one or more of the side obstacle sensors 138A, or both sensors 138A, 138B.

When one or more of the obstacle sensors 138A, 138B register an impact event, the autonomous vacuum cleaner 110 can react to avoid the obstacle. For example, the autonomous vacuum cleaner 110 can cease moving toward the obstacle, such as by driving one or multiple wheels in reverse to avoid further impact with the obstacle, depending on the number and location of the obstacle sensors 138A, 138B that are activated.

When one or more of the cliff sensors 136 register a cliff event, the autonomous vacuum cleaner 110 can react to restrict movement toward the cliff. For example, the autonomous vacuum cleaner 110 can cease moving toward the cliff, such as by driving only one wheel to turn the unit 112 away from the cliff or by driving multiple wheels in reverse to translate the unit 112 back from the cliff, depending on the number and location of the cliff sensors 136 that are activated.

When one or more of the cliff sensors 136 are occluded by the bumper 128 due to an impact, and the obstacle sensors 138A, 138B fail to register the impact, the autonomous vacuum cleaner 110 can treat this as a cliff event, and can react to restrict movement toward the obstacle. For example, the autonomous vacuum cleaner 110 can cease moving toward the obstacle, such as by driving only one wheel 34 to turn the unit 112 away from the obstacle or by driving multiple wheels in reverse to translate the unit 112 back from the obstacle, depending on the number and location of the cliff sensors 136 that are activated. Alternatively, the autonomous vacuum cleaner 110 can be configured to discern whether the cliff sensor 136 is triggered by an actual cliff event versus by the bumper 128, as described above.

When one or more of the cliffs sensors 136 are occluded by the bumper 128 due to an impact, and one or more of the obstacle sensors 138A, 138B do register the impact, the autonomous vacuum cleaner 110 can treat this as an impact event, as described above.

Figure 10:
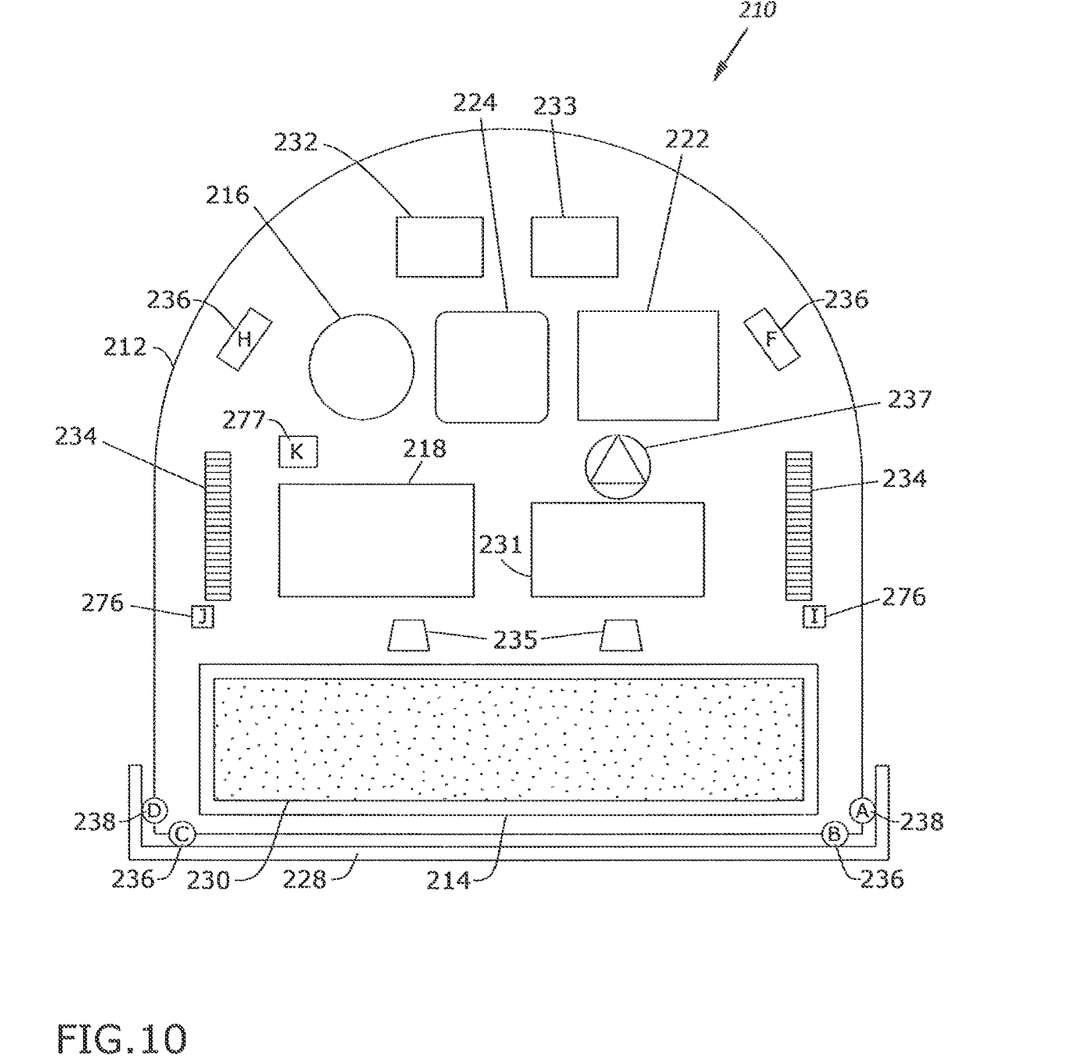
FIG. 10 is a schematic view of an autonomous surface cleaner according to another aspect of the present disclosure.

While various embodiments illustrated herein show an autonomous or robotic vacuum cleaner, aspects of the invention may be used on other types of floor cleaners having obstacle sensors, including wet cleaning robots configured to supply and/or recover liquid. For example, FIG. 10 illustrates another autonomous cleaner or robot 210 similar to the autonomous cleaners 10 and 110 previously described and therefore, like parts will be identified with like numerals in the 200 series, with it being understood that the description of the like parts of the applies to the robot 210, unless otherwise noted. The robot 210 has been illustrated in the form of an autonomous deep cleaner or deep cleaning robot and is but one example of an autonomous surface cleaning device that is usable with an operational control module 233. Other autonomous surface cleaning devices that can be utilized with the operational control module 233 include, but are not limited to, dry vacuuming cleaning robots or autonomous cleaners capable of delivering steam, mist, or vapor to the surface to be cleaned.

The robot 210 mounts the components of various functional systems in an autonomously moveable unit. The robot 210 can include a housing 212 adapted to selectively mount components of the systems to form a unitary movable device. In another example (not shown), the fluid supply system can be eliminated and the autonomous surface cleaning device can be configured as a "dry" vacuum cleaner which collects substantially dry debris and not fluid from a surface to be cleaned.

By way of non-limiting example, a fluid supply system can include a supply tank 231 for storing a supply of cleaning fluid and a fluid distributor 235 in fluid communication with the supply tank 231 for depositing a cleaning fluid onto the surface. The cleaning fluid can be a liquid such as water or a cleaning solution specifically formulated for carpet or hard surface cleaning. The fluid distributor 235 can be one or more spray nozzle provided on the housing 212 of the robot 210. Alternatively, the fluid distributor 235 can be a manifold having multiple outlets. A fluid delivery pump or pump 237 can be provided in the fluid pathway between the supply tank 231 and the fluid distributor 235 to control the flow of fluid to the fluid distributor 235. A pump motor driver 237a can also be provided to control operation of the pump 237, such as in the form of an integrated circuit (IC) chip. Various combinations of optional components can be incorporated into the fluid supply system as is commonly known in the art, such as a heater for heating the cleaning fluid before it is applied to the surface or one more fluid control and mixing valves.

The vacuum collection system can include a working air path through the unit having an air inlet and an air outlet, a suction nozzle 214 which is positioned to confront the surface to be cleaned and defines the air inlet, a suction source 216 in fluid communication with the suction nozzle 214 for generating a working air stream, and a recovery tank 218 for collecting dirt from the working airstream for later disposal. The suction nozzle 214 can define the air inlet of the working air path. The suction source 216 can be a vacuum motor carried by the unit, fluidly upstream of the air outlet, and can define a portion of the working air path. A motor driver 216a can be provided for controlling operation of the suction source 216, and can be in the form of an IC chip. The recovery tank 218 can also define a portion of the working air path, and comprise a recovery tank inlet in fluid communication with the air inlet. A separator 218a can be formed in a portion of the recovery tank 218 for separating fluid or entrained dirt from the working airstream. Some non-limiting examples of the separator 218a include an air/liquid separator, one or more cyclone separators, a filter screen, a foam filter, a HEPA filter, a filter bag, or combinations thereof. Optionally, a pre-motor filter and/or a post-motor filter can be provided as well.

The agitation system for agitating the surface to be cleaned can include at least one agitator 230, such as a brushroll mounted for rotation about a substantially horizontal axis, relative to the surface over which the unit moves. A brush drive assembly including a separate, dedicated agitator motor 230a can be provided within the unit to drive the agitator 230. Alternatively, the agitator 230 can be driven by the suction source 216. Other agitators are also possible, including one or more stationary or non-moving brushes or pads, or one or more brushes or pads that rotate about a substantially vertical axis and are driven by one or more dedicated brush motors. An agitator motor driver 230b can be provided to control operation of the agitator motor 230a, such as in the form of an IC chip.

While not shown, a squeegee can be provided on the housing 212 of the robot 210, adjacent the suction nozzle 214, and can be configured to contact the surface as the robot 210 moves across the surface to be cleaned. The squeegee can wipe residual liquid from the surface to be cleaned so that it can be drawn into the fluid recovery pathway via the suction nozzle 214, thereby leaving a moisture and streak-free finish on the surface to be cleaned.

The drive system can include drive wheels 234 for driving the robot 210 across a surface to be cleaned. Multiple drive wheels 234 can be operated by a common wheel motor 234a. Alternately, individual wheel motors 234a can be coupled with corresponding individual drive wheels 234a, such as by a transmission which may include a gear train assembly or another suitable transmission. The drive system can receive inputs from the main controller 232 for driving the robot 210 across a surface, based on inputs from the navigation/mapping system 270. The drive wheels 234 can be driven in in a forward or reverse direction in order to move the robot 210 forwardly or rearwardly. Furthermore, the drive wheels 234 can be operated simultaneously or individually in order to pivot or turn the robot 210 in a desired direction. A wheel motor driver 234b can be provided to control operation of the wheel motor 234a and can also be in the form of an IC chip.

A navigation/mapping system 270 (shown in FIG. 11) can also be provided in the robot 210 and operably coupled with the drive system for guiding the movement of the robot 210 over the surface to be cleaned, generating and storing maps of the surface to be cleaned, and recording status or other environmental variable information.

Figure 12:
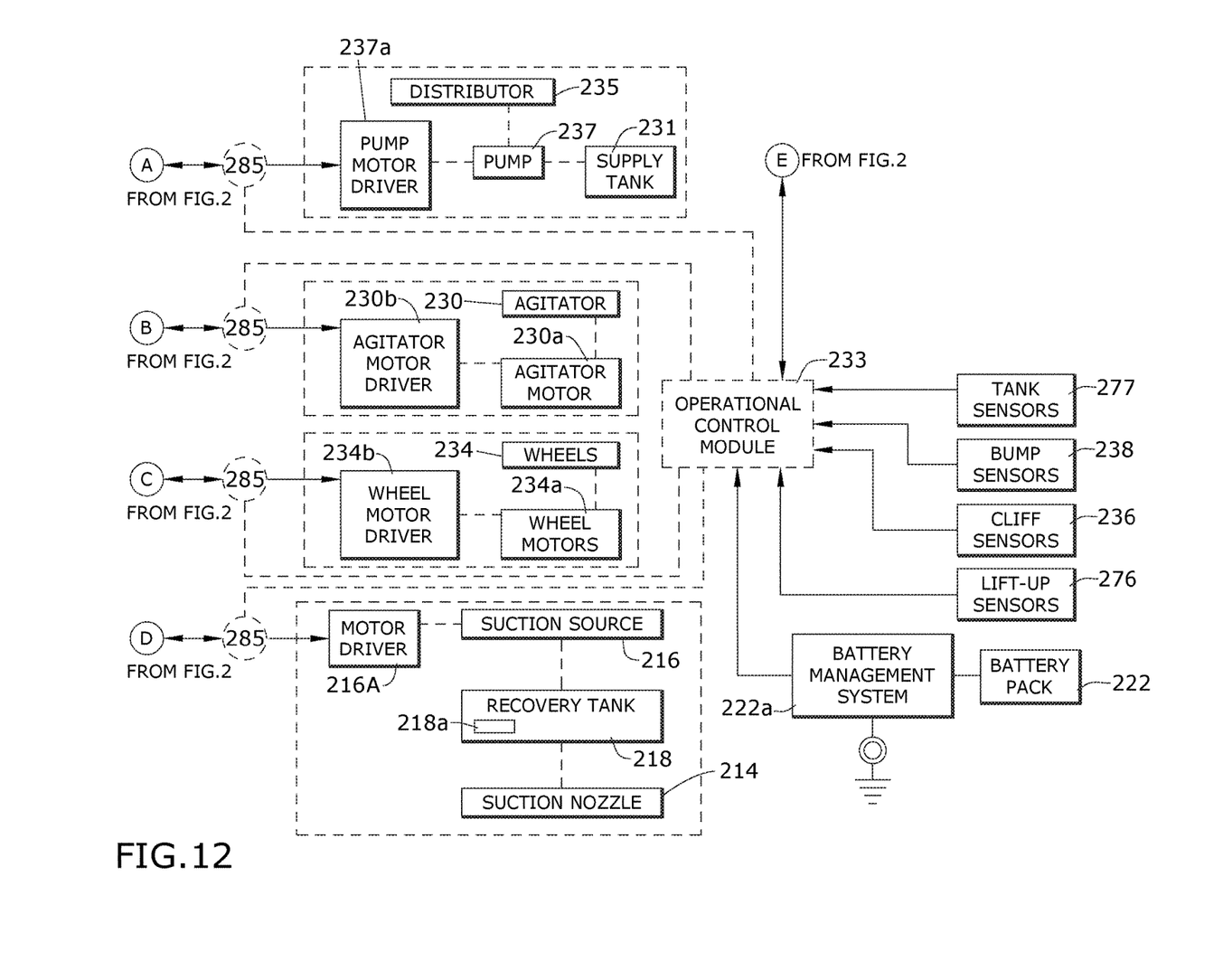
FIG. 12 is a schematic view illustrating additional functional systems and components of the autonomous surface cleaning device of FIG. 10.

Electrical components of the robot 210 can be electrically coupled to a battery management system 222a and battery pack 222. (FIG. 12).

A main controller 232 (FIG. 11) is operably coupled with at least some of the various functional systems of the robot 210 for controlling its operation. The main controller 232 can be a microcontroller unit (MCU) that contains at least one central processing unit (CPU). In one aspect of the present disclosure the main controller 232 can monitor and control at least the navigation functions of the robot 210.

The operational control module 233 (FIG. 12) is a microcontroller, separate from the main controller 232, which monitors compliance inputs and provides status information to the main controller 232. The operational control module 233 provides detailed status information and enables, through a communications interface, including individual discrete outputs that the main controller 232 can use as a basis to generate an interrupt. In one non-limiting example, the communications interface can be a unidirectional universal asynchronous receiver/transmitter (UART) interface. In another non-limiting example, the communications interface can be an inter-integrated circuit (I²C) bus. In one aspect of the present disclosure the operational control module 233 provides information to the main controller 232 and does not receive any information from the main controller 232. This unidirectional communication can prevent any software updates or modifications to the main controller 232 from affecting the performance and security of the operational control module 233.

Figure 11:
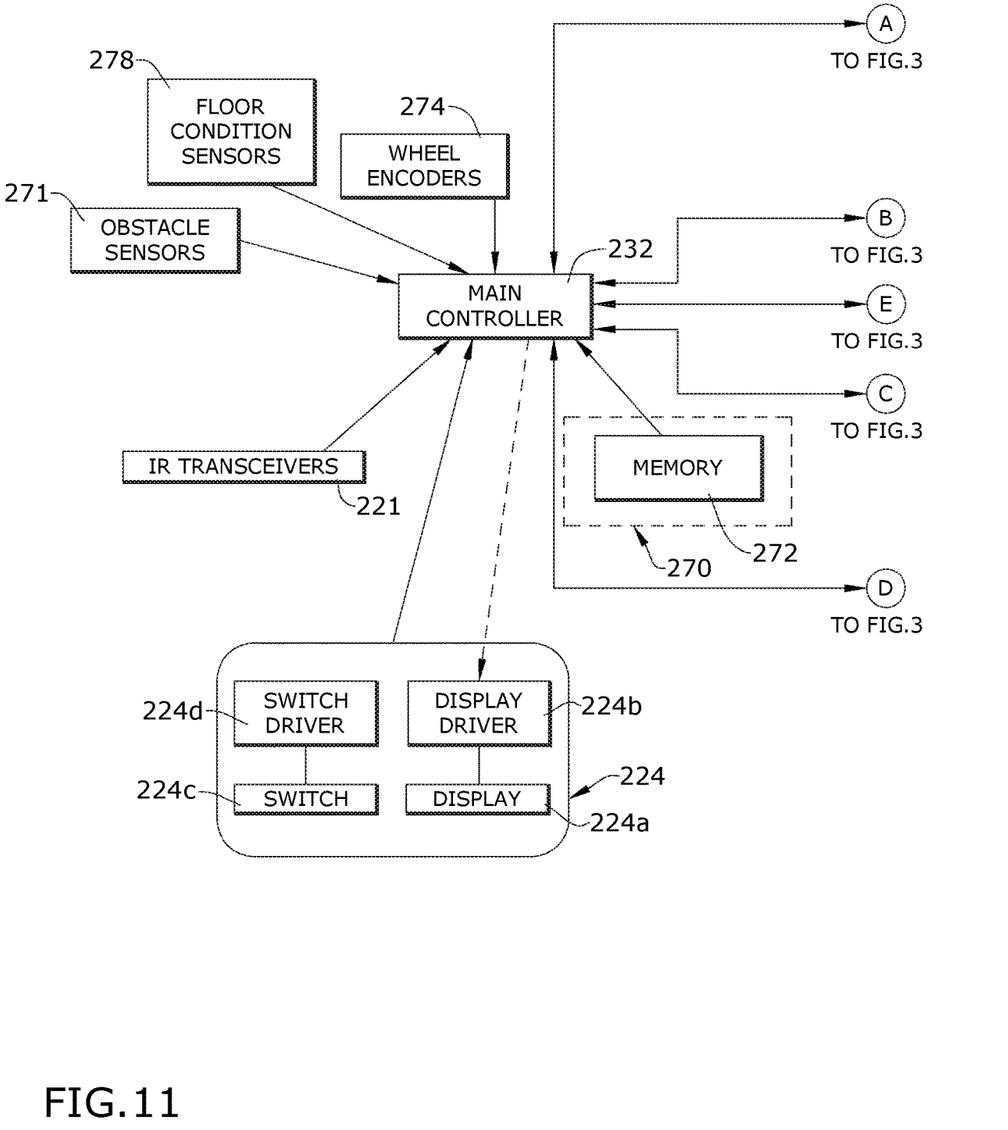
FIG. 11 is a schematic view illustrating functional systems and components of the autonomous surface cleaning device of FIG. 10.

The main controller 232 can receive input from the navigation/mapping system 270 for directing the drive system to move the robot 210 over the surface to be cleaned. The navigation/mapping system 270 can include a memory 272 that stores maps for navigation and inputs from various sensors, which is used to guide the movement of the robot 210. For example, wheel encoders can be placed on the drive shafts of the wheel motors 234a, and are configured to measure the distance travelled. This measurement can be provided as input to the main controller 232 or the operational control module 233.

The operational control module 233 monitors inputs from various components and subsystems related to one or more compliance-critical functions of the robot 210, and provides status signals to the main controller 232 of the robot 210. Either or both of the operational control module 233 and the main controller 232 can generate an interrupt 285 configured to modify or cease operation of the robot 210 or any system or component thereof. The interrupts 285 can be signals or instructions to cease or modify operation of a selected component or system in the robot 210. In one example, the main controller 232 can generate interrupts 285 for the fluid supply system, the brush system, the drive system, and the vacuum collection system based on status signals from the operational control module 233. In one example, the operational control module can interrupt, modify, or cease operation of the robot 210, independently of the main controller 232, when predetermined sensor input thresholds are exceeded. In another example, signals sent from the operational control module 233 to the main controller 232 can instruct the main controller 232 to interrupt, modify, or cease operation of the robot 210 when predetermined sensor input thresholds are exceeded.

The main controller 232 is further operably coupled with a user interface (UI) 224 (FIG. 11) configured to receive inputs from and provide notifications to a user. The user interface 224 can be used to select an operation cycle for the robot 210 or otherwise control the operation of the robot 210. The user interface 224 can have a display 224a, such as a light-emitting diode (LED) display provided on a base or the housing 212 of the robot 210, for providing visual notifications to the user. Examples of such visual notifications can include indications of operational status and diagnostic information such as battery and/or filter life status, wireless connectivity status such as WiFi or Bluetooth, and various error or fault codes, including errors and status information detected by the operational control module 233. A display driver 224b can be provided for controlling the display 224a and can act as an interface between the main controller 232 and the display 224a. The display driver 224b may be an integrated circuit (IC) chip.

The main controller 232 and operational control module 233 can further be operably coupled with various sensors for receiving input about the environment and can use the sensor input to control the operation of the robot 210. It is contemplated that the operational control module 233 can receive information from obstacle or bump sensors 238, which can be provided for determining front or side impacts to the robot 210. The bump sensors 238 may be integrated with a bumper 228 on the housing 212 of the robot 210.

Further, the operational control module 233 can receive information from cliff sensors 236, which can also be provided for avoiding excessive drops such as stairwells or ledges. The cliff sensors 236 can be bottom-facing optical position sensors that provide distance feedback to the operational control module 233. In addition to optical sensors, the cliff sensors 236 can be mechanical or ultrasonic sensors. As with the previously explained example, the cliff sensor 236 can operate to provide for redundant obstacle sensing. The bumper 228 can be provided with cliff sensor actuator members (not shown) that activate the associated cliff sensors 236. The cliff sensor actuator members can be positioned closely to the cliff sensors 236 to maximize occlusion to the sensor's emitter and/or receiver. The cliff sensor actuator member may be configured to only begin to occlude the cliff sensor 236 as the bumper 228 reaches full compression. The bumper 228 and associated cliff sensor 236 can provide redundant obstacle sensing in case of failure of one or more of the primary obstacle sensors or bump sensors 238 without incurring the cost of adding additional sensing components.

When one or more of the obstacle sensors or bump sensors 238 register an impact event, the operational control module 233 can provide the main controller 232 with instructions such that it can react to avoid the obstacle. For example, the autonomous vacuum cleaner 210 can cease moving toward the obstacle, such as by driving one or multiple wheels in reverse to avoid further impact with the obstacle, depending on the number and location of the obstacle sensors or bump sensors 238 that are activated.

When the set of cliff sensors 236 register a cliff event the operational control module 233 can provide the main controller 232 with instructions such that it can react to restrict movement toward the cliff. It will be understood that this can be true for any number of cliff sensors included in the set of cliff sensors, including a single cliff sensor. For example, the autonomous vacuum cleaner 210 can cease moving toward the cliff, such as by driving only one wheel to turn away from the cliff or by driving multiple wheels in reverse to translate back from the cliff, depending on the number and location of the cliff sensors 236 that are activated.

When one or more of the cliff sensors 236 are occluded by the bumper 228 due to an impact, and the obstacle sensors or bump sensors fail to register the impact, the autonomous vacuum cleaner 210 can treat this as a cliff event, and can react to restrict movement toward the obstacle. It will be understood that the bumper 228 may occlude or partially occlude a subset of the set of cliff sensors 236. The operational control module 233 can provide the main controller 232 with instructions to cease moving toward the obstacle. The autonomous vacuum cleaner 210 can be configured to discern whether the cliff sensor 236 is triggered by an actual cliff event versus by the bumper 228, as described above. When one or more of the cliff sensors 236 are occluded by the bumper 228 due to an impact, and one or more of the obstacle sensors or bump sensors 238 do register the impact, the autonomous vacuum cleaner 110 can treat this as an impact event, as described above.

The robot 210 can optionally include one or more tank sensors 277 (FIG. 12) for detecting the presence (or absence) of the supply and recovery tanks 231, 248. For example, the tank sensors 277 can be in the form of one or more pressure sensors for detecting the weight of the supply tank 231 and the recovery tank 218. This information is provided as an input to the operational control module 233. In one example, the operational control module 233 can be configured to generate an interrupt 285 until output from the tank sensors 277 indicates that both the recovery tank 218 and supply tank 231 are present or properly installed. The main controller 232 may also direct the display 224a to provide a notification to the user that the supply tank 231 or recovery tank 218 is missing. In this manner, the operational control module 233 can prevent operation of the robot 210 until both the supply tank 231 and the recovery tank 218 are detected.

The robot 210 can further include one or more floor condition sensors 278 for detecting a condition of the surface to be cleaned. For example, the robot 210 can be provided with an infrared dirt sensor, a stain sensor, an odor sensor, and/or a wet mess sensor. The floor condition sensors 278 provide input to the main controller 232, which may direct operation of the robot 210 based on the condition of the surface to be cleaned, such as by selecting or modifying a cleaning cycle.

The robot 210 can further include one or more IR transceivers 221 for communicating with peripheral devices such as a docking station and/or artificial barrier system (not shown). The one or more IR transceivers 221 on the robot 210 and corresponding transceivers on the associated peripheral device can be set up on a frequency-based communication protocol such that each pair of associated IR transceivers can be configured to transfer distinct code sets, which can comprise a variety of different instructions with predefined responses. The robot 210 can have a plurality of IR transceivers around the perimeter of the unit to sense the IR signals emitted from the artificial barrier generator and output corresponding signals to the main controller 232, which can adjust drive wheel 234 control parameters to adjust the position of the robot 210 to avoid the boundaries established by the artificial barrier encoded IR beam and the short field IR beams. This prevents the robot 210 from crossing the artificial barrier boundary and/or colliding with the artificial barrier generator housing.

In operation, the operational control module 233 can monitor inputs from various compliance-monitoring sensors related to compliance-critical functions of the robot 210. Information about sensor status or compliance events can be provided as an input to the operational control module 233. For example, the operational control module 233 can be responsible for generating an interrupt 285 to restrict the movement of the drive system in response to compliance events from bump sensors 238 and cliff sensors 236. The operational control module 233 can also generate an interrupt 285 to disable exposed moving parts including, but not limited to, the pump 237, the agitator 230, the suction source 216, and/or the drive wheels 234 in response to compliance events from lift-up sensors 276. As used herein, exposed moving parts are any moving parts of the robot 210 that are exposed outside the housing 212.

In another example of operation, the operational control module 233 can relay information about sensor status, compliance events, or generated interrupts to the main controller 232. Such information can be transmitted directly to the main controller 232, such as via a direct connection (not shown). Alternately, information about sensor status or compliance events can be relayed indirectly to the main controller 232. In one example, the operational control module 233 can generate an interrupt 285 to cease operation of the pump 237 during execution of a cleaning cycle or program, for example due to output from the lift-up sensors 276 that indicate the robot 210 has been lifted off the surface. The main controller 232 can monitor input from the pump 237 and detect its inoperative status during the cleaning cycle, and indirectly detect, infer, or confirm that an interrupt 285 was transmitted to the pump 237 by the operational control module 233. The main controller 232 can be further configured to generate additional interrupts 285 for other components or systems within the robot 210 based on the indirect detection of the interrupt 285 for the pump 237.

In another example of operation, the operational control module 233 can transmit a status signal to the main controller 232 which can include information about one or more sensors in the robot 210. The main controller 232 can generate an interrupt 285 based on the transmitted status signal or based on output from the sensors, such as to halt operation of the pump 237, agitator motor 230a, suction source 216, and/or wheel motors 234a. Additionally, the lift-up sensors 276 may also detect when the robot 210 is in contact with the surface to be cleaned, such as when the user places the robot 210 back on the ground. Upon such input, the main controller 232 may resume operation of the pump 237, agitator motor 230a, suction source 216, and/or wheel motors 234a.

In still other examples of operation, output signals from the bump sensors 238 can provide inputs to the operational control module 233, which relays the information to the main controller 232 for selecting an obstacle avoidance algorithm based thereon. Output signals from the cliff sensors 236 can also provide inputs to the operational control module 233, which relays the information to the main controller 232 to control the robot 210 so that the robot 210 can avoid excessive drops.

It is contemplated that the operational control module 233 can include software designed to be Underwriters Laboratories (UL) Class B compliant and to meet the requirements of UL 21017 Table 31 and in accordance with paragraph 4.11.4.3. UL 21017 pertains to motor-operated vacuum cleaners and blower cleaners, floor sweepers, and to household use floor finishing machines. The software is designed to be UL Class B in accordance with CAN/CSA-E60730-1 and UL 60730-1, Annex H, Clause H.11.12.3. Other aspects of the operational control module 233 can include software designed to be compliant with other standards. By partitioning control of various components and subsystems of the robot 210, in particular the various sensors which provide input used to control the robot 210, between two separate controllers, i.e. the operational control module 233 and the main controller 232, the main controller 232 does not have to be UL certified or UL compliant, i.e. it may not be UL Class B compliant and may not meet the requirements of UL 21017 Table 31 and in accordance with paragraph 4.11.4.3. An example of various software architecture including that of sensor managers and drive authorities is disclosed in WIPO Publication No. 2019/083836, which is incorporated herein by reference in its entirety.

Bumper status messages are sent by the operational control module 233 to the main controller 232 and include a summary of the bumper status of the robot 210. The bumper status messages can be sent as needed, such as when a bump sensor 238 is activated, and are nominally not sent. In one non-limiting example, a bumper status message can be sent at a rate of 4 Hz when the bumper collides with an object, and another bumper status message can be sent at a rate of 4 Hz for one second after the bumper clears the object.

Cliff status messages are sent by the operational control module 233 to the main controller 232 and include a summary of the cliff status of the robot 210. The cliff status messages can be sent as needed, such as when a cliff sensor 236 is activated, and are nominally not sent. In one non-limiting example, a cliff status message can be sent at a rate of 4 Hz when the cliff sensor 236 detects a cliff, and another cliff status message can be sent at a rate of 4 Hz for one second after the robot 210 is clear of the cliff.

Version messages are sent by the operational control module 233 to the main controller 232 and include version information about the software for the operational control module 233. The version messages can be sent at a combination of predefined and periodic intervals, such as, but not limited to, one minute after the robot 210 is powered on and every 15 minutes thereafter.

In another example not shown herein, an autonomous vacuum cleaner can have a rear bumper that extends at least partially along a rear of the autonomously moveable housing or unit. The rear bumper can be configured to move at least in response to rear impacts, i.e. when the autonomous cleaner strikes or collides with an object somewhere along the rear of the autonomous cleaner and can optionally also be configured to move in response to side impacts. In addition to interacting with obstacle sensors, the rear bumper can interact with at least one cliff sensor for redundant obstacle sensing. For example, the rear bumper can interact with one or both of the cliff sensors provided in the back corners of the unit, behind the drive wheels. The rear bumper can be provided in addition to a front bumper, such as in addition to the bumpers 28, 128, 228 described previously, but can also be provided on an autonomous vacuum cleaner without a front bumper.

There are several advantages of the present disclosure arising from the various features of the apparatuses described herein. For example, the embodiments described above provides an autonomous floor cleaner with activation redundancy. Autonomous floor cleaners currently available have both obstacle sensors and cliff sensors, but the cliff sensors only register excessive drops such as stairwells or ledges, so that autonomous floor cleaners can avoid them. An advantage of the embodiments of the present disclosure is that by configuring the bumper to occlude a cliff sensor or otherwise register a cliff event when compressed, the cliff sensor can also act as an obstacle sensor. Thus, the embodiment of the autonomous floor cleaner disclosed herein has a redundant obstacle sensor in case of failure of the primary obstacle sensor, without incurring the cost of adding additional components. One of the benefits of at least some of the disclosed operational control module aspects described herein is that by providing an additional controller to the main controller and partitioning control of various components and subsystems of the robot, in particular the various sensors which provide input used to control the autonomous vacuum cleaner, between two separate controllers, new software and updates can be provided to one controller without affecting the other controller, i.e. the operational control module.

To the extent not already described, the different features and structures of the various embodiments of the autonomous floor cleaners may be used in combination with each other as desired. That one feature may not be illustrated in all of the embodiments of autonomous floor cleaner is not meant to be construed that it cannot be, but is done for brevity of description. Thus, the various features of the different embodiments of the autonomous floor cleaners may be mixed and matched as desired to form new embodiments, whether or not the new embodiments are expressly described. For example, a secondary controller can be utilized in a dry autonomous cleaner.

While the invention has been specifically described in connection with certain specific embodiments thereof, it is to be understood that this is by way of illustration and not of limitation. For example, while illustrated on one embodiment of an autonomous vacuum cleaner, it is understood that any of the features disclosed herein can be provided alone or in combination with each other. Reasonable variation and modification are possible within the scope of the foregoing description and drawings without departing from the spirit of the invention which is defined in the appended claims.

What is claimed is:

1. An autonomous surface cleaner, comprising:
   an autonomously moveable housing defining an outer periphery;
   a collection system carried by the autonomously moveable housing and comprising:
      a working air path through the housing having an air inlet and an air outlet;
      a suction nozzle defining the air inlet; and
      a suction source in fluid communication with the suction nozzle;

a set of cliff sensors carried by the autonomously moveable housing;

at least one bumper provided on at least a portion of the outer periphery and moveably coupled thereto between a home position and a compressed position that is moved inwardly towards the autonomously moveable housing from the home position; and at least one controller configured to receive information from the set of cliff sensors and determine based on the received information one of a cliff event indicative of a drop or an impact event indicative of an obstacle.

2. The autonomous surface cleaner of claim 1 wherein the set of cliff sensors comprise multiple bottom-facing optical position sensors configured to provide distance feedback and wherein the at least one controller is configured to receive the distance feedback and operate the autonomous surface cleaner based thereon.

3. The autonomous surface cleaner of claim 1, further comprising a cliff sensor actuator member operably coupled to the at least one bumper and wherein the cliff sensor actuator activates at least one cliff sensor of the set of cliff sensors upon an impact event.

4. The autonomous surface cleaner of claim 3 wherein the cliff sensor actuator member comprises a projection extending from the bumper on an inwardly-facing side of the bumper that is configured to occlude at least a portion of the at least one cliff sensor of the set of the cliff sensors when the bumper is in the compressed position.

5. The autonomous surface cleaner of claim 3 wherein the cliff sensor actuator member at least partially occludes the at least one cliff sensor of the set of cliff sensors when the bumper reaches the compressed position.

6. The autonomous surface cleaner of claim 1, further comprising a set of obstacle sensors provided adjacent the at least one bumper and configured to be actuated by movement of the at least one bumper to the compressed position.

7. The autonomous surface cleaner of claim 6 wherein the set of obstacle sensors comprises multiple obstacle sensors provided at a front and at least one side of the autonomously moveable housing.

8. The autonomous surface cleaner of claim 6 wherein at least one obstacle sensor of the set of obstacle sensors includes a tactile bump switch module located behind the bumper and wherein movement of the bumper towards the compressed position is configured to actuate the at least one obstacle sensor of the set of obstacle sensors.

9. The autonomous surface cleaner of claim 6 wherein the controller determines the cliff event when at least one cliff sensor of the set of cliff sensors is at least partially occluded by the bumper and the set of obstacle sensors are not actuated and the controller determines the impact event when at least one cliff sensor of the set of cliff sensors is at least partially occluded and at least one of the set of obstacle sensors is actuated.

10. The autonomous surface cleaner of claim 1, further comprising a drive system including a set of wheels.

11. The autonomous surface cleaner of claim 10 wherein the at least one controller comprises an operational controller communicatively coupled with a main controller and wherein the operational controller receives output from the set of cliff sensors and is configured to communicate to the main controller to operate the drive system based thereon.

12. The autonomous surface cleaner of claim 11 wherein when the operational controller determines the impact event based on output from the set of cliff sensors, the operational controller is configured to communicate to the main controller to cease moving toward the obstacle, to turn away from the obstacle, or to operate in reverse.

13. The autonomous surface cleaner of claim 1 wherein the outer periphery of the autonomously moveable housing includes a front, a rear, a first side, and a second side.

14. The autonomous surface cleaner of claim 13 wherein the autonomously moveable housing has a D-shape when viewed from above, with the front being defined by a straight front edge and the rear being defined by a rounded rear edge and wherein a brushroll is mounted behind the straight front edge.

15. The autonomous surface cleaner of claim 14 wherein the housing defines front corners and back corners, and wherein the set of cliff sensors comprise a cliff sensor provided in each of the front corners behind the bumper and in front of the brushroll and a cliff sensor provided in each of the back corners.

16. The autonomous surface cleaner of claim 13 wherein the at least one bumper is disposed along an entire front of the autonomously moveable housing and partially along the first side and the second side.

17. The autonomous surface cleaner of claim 16 wherein the bumper is configured to move towards the autonomously moveable housing to the compressed position in response to either a front impact or a side impact.

18. A method for operating an autonomous floor cleaner, the method comprising:

driving an autonomously moveable housing having a moveable bumper provided adjacent at least one cliff sensor; and determining, via a controller, from an output of the at least one cliff sensor and at least one of: a position of the bumper, input from a dedicated obstacle sensor, an inertial measurement unit, or drive system data whether a cliff event has occurred or an impact event has occurred.

19. The method of claim 18, further comprising operating a drive system of the autonomous floor cleaner in response to the determining of the impact event.

20. The method of claim 19 wherein the controller upon determining the impact event has occurred is configured to communicate to a second controller, operably coupled to the drive system, to cease moving toward the obstacle, to turn away from the obstacle, or to operate in reverse.

* * * * *